(12) United States Patent
Bianchini, Jr.

(10) Patent No.: US 7,031,330 B1
(45) Date of Patent: Apr. 18, 2006

(54) VERY WIDE MEMORY TDM SWITCHING SYSTEM

(75) Inventor: Ronald P. Bianchini, Jr., Pittsburgh, PA (US)

(73) Assignee: Marconi Intellectual Property (Ringfence), Inc., Warrendale, PA (US)

( * ) Notice: Subject to any disclaimer, the term of this patent is extended or adjusted under 35 U.S.C. 154(b) by 0 days.

(21) Appl. No.: 09/293,563

(22) Filed: Apr. 15, 1999

(51) Int. Cl.
*H04L 12/56* (2006.01)
*H04L 12/50* (2006.01)

(52) U.S. Cl. ................................ 370/412; 370/362

(58) Field of Classification Search ........ 370/411–419, 370/421–423, 428–429, 458–462, 360, 363–383, 370/386, 395.1, 396, 395.4–395.43, 395.7, 370/395.71, 395.72, 362; 711/147–149, 711/153, 154; 365/189.01–189.05
See application file for complete search history.

(56) References Cited

U.S. PATENT DOCUMENTS

| | | | | |
|---|---|---|---|---|
| 5,233,603 A * | 8/1993 | Takeuchi et al. | ............ | 370/412 |
| 5,309,432 A * | 5/1994 | Kanakia | ............ | 370/412 |
| 5,475,680 A * | 12/1995 | Turner | ............ | 370/412 |
| 5,535,197 A * | 7/1996 | Cotton | ............ | 370/414 |
| 5,574,505 A * | 11/1996 | Lyons et al. | ............ | 375/240.26 |
| 5,732,041 A * | 3/1998 | Joffe | ............ | 365/189.04 |
| 5,774,453 A * | 6/1998 | Fukano et al. | ............ | 370/414 |
| 5,802,052 A * | 9/1998 | Venkataraman | ............ | 370/395.72 |
| 5,838,677 A * | 11/1998 | Kozaki et al. | ............ | 370/412 |
| 5,910,928 A * | 6/1999 | Joffe | ............ | 365/189.05 |
| 5,991,295 A * | 11/1999 | Tout et al. | ............ | 370/395.7 |
| 6,034,957 A * | 3/2000 | Haddock et al. | ............ | 370/392 |
| 6,038,215 A * | 3/2000 | Uekumasu | ............ | 370/412 |
| 6,046,997 A * | 4/2000 | Fan | ............ | 370/395.71 |
| 6,061,358 A * | 5/2000 | Nelson et al. | ............ | 370/412 |
| 6,067,298 A * | 5/2000 | Shinohara | ............ | 370/413 |
| 6,137,807 A * | 10/2000 | Rusu et al. | ............ | 370/429 |
| 6,470,021 B1 * | 10/2002 | Daines et al. | ............ | 370/422 |

* cited by examiner

*Primary Examiner*—Steven Nguyen
(74) *Attorney, Agent, or Firm*—Ansel M. Schwartz

(57) ABSTRACT

A switching system. The system includes I input port mechanisms which receive packets from a communication line and have a width, where I is greater than or equal to 1 and is an integer. The system includes O output port mechanisms which send packets to a communication line and have a width, where O is greater than or equal to 1 and is an integer. The system includes a carrier mechanism along which packets travel. The carrier mechanism has a width wider than the width of the input and output port mechanisms. The carrier mechanism is connected to each input port mechanism and each output port mechanism. The system includes a memory mechanism in which packets are stored. The memory mechanism is connected to the carrier mechanism. The system includes a mechanism for providing packets to the memory mechanism though the carrier mechanism from the input port mechanisms. The providing mechanism is able to transfer packets or portions of packets whose total width equals the width of the carrier mechanism in each transfer cycle to the memory mechanism. A switching system for packets. A method for switching packets. The method includes the steps of receiving a first packet and at least a second packet at a switch mechanism. The method includes the steps of transferring data of the first packet and the second packet to a memory mechanism via time division multiplexing of a bus having a width so data from the packets fills a predetermined portion of the width of the bus. The bus width is not necessarily equal to the packet size.

24 Claims, 6 Drawing Sheets

VERY WIDE MEMORY TDM SWITCHING SYSTEM

FIELD OF THE INVENTION

The present invention is related to time division multiplexed switches. More specifically, the present invention relates to time division multiplexing of switches where a memory bus width is independent of the width of any packet.

BACKGROUND OF THE INVENTION

Time division multiplexing is one technique used to implement a switching system. Consider a switch fabric with N input ports that each receive packets at rate R and N output ports that each transmit packets at rate R, as shown in FIG. 1. For a shared memory TDM switching system, a single memory bus is required that has an aggregate bandwidth of 2×N×R. The arriving packets are aggregated and written to the memory. Once written to memory, the packets are read out of the memory and transmitted on the output ports.

This system operates correctly and in a non-blocking fashion provided that the shared memory has enough bandwidth to service all of the input and output ports. Memory bandwidth can be increased by increasing the speed and width of the memory bus. Current memory bus speeds are technology limited to roughly 300 MHz, using microprocessor synchronous cache memories. To further increase memory bandwidth, the memory bus must be made wider.

Consider an example TDM switching system with 4 inputs and 4 outputs, as shown in FIG. 2. The input and output ports consist of 1-bit wide data paths and run at a single fixed clock rate that is the same for all ports and the memory bus. Assume that all packets are 8-bits in length. The fabric can be implemented with an 8-bit wide TDM memory bus. Over a period of 8 clock cycles, each input port is allocated one clock cycle to write a packet (8-bits) to memory and each output port is allocated one clock cycle to read a packet from memory.

There are several issues that complicate the design of TDM switching systems in practice. Depending on the application of the switching system, packets usually vary in size. Variable sized packets reduce the performance of TDM systems due to packet fragmentation on the memory bus. If a packet doesn't utilize an integral number of memory cycles, memory bandwidth is wasted on memory cycles that read or write data that is less than the memory bus width. Typically, TDM systems are implemented with a memory bandwidth greater than 2×N×R to compensate for inefficiencies due to fragmentation.

Fragmentation issues become significant as the memory width approaches, or exceeds, the minimum sized data packet. Consider a system with a memory bus width that is equal to twice the minimum packet length. During a period in which all received packets have length equal to the minimum packet length, the memory system bandwidth is reduced by 50% (or is 50% efficient), since all packets written to memory utilize only half of the memory bus data bits.

Due to packet fragmentation on the memory bus, typical TDM switching systems utilize bus widths that are at most as wide as a minimum length packet.

The total bandwidth of a shared memory TDM switching system is limited by the bandwidth of the memory bus. Memory bus bandwidth is determined by its speed (clock rate) and its width (number of bits). Given that memory speeds are fixed by the technology of available memory components, then the total bandwidth of TDM switches is limited by the minimum packet size.

SUMMARY OF THE INVENTION

The present invention pertains to a switching system. The system comprises I input port mechanisms which receive packets from a communication line having a width, where I is greater than or equal to 1 and is an integer. The system comprises O output port mechanisms which send packets to a communication line having a width, where O is greater than or equal to 1 and is an integer. The system comprises a carrier mechanism along which packets travel. The carrier mechanism has a width wider than the width of the input and output communication lines. The carrier mechanism is connected to each input port mechanism and each output port mechanism. The system comprises a memory mechanism in which packets are stored. The memory mechanism is connected to the carrier mechanism. The system comprises a mechanism for providing packets to the memory mechanism through the carrier mechanism from the input port mechanisms. The providing mechanism is able to transfer packets or portions of packets whose total width equals the width of the carrier mechanism in each transfer cycle to the memory mechanism.

The present invention pertains to a switching system for packets. The system comprises a central resource having a width and an overall bandwidth and input port mechanisms and output port mechanisms for receiving or sending packets, respectively. The central resource is partitioned via time slots that are allocated to the input and output port mechanisms. The central resource width is independent of any packet width and the overall bandwidth can grow without bound. The system comprises a memory mechanism for storing packets. The memory mechanism is connected to the central resource.

The present invention pertains to a switching system. The system comprises a time division multiplex bus. The system comprises a memory mechanism connected to the bus which is accessed via time division multiplexing of the bus. The system comprises a mechanism for reading and writing data of packets to the memory mechanism through the bus without knowledge of the packet boundaries of the data.

The present invention pertains to a switching system. The system comprises a time division multiplex carrier mechanism having a width. The system comprises a memory mechanism connected to the carrier mechanism. The system comprises an input mechanism having a width for providing data of packets to the memory mechanism so the data of the packets fills the width of the bus via time division multiplexing. The bus width is a positive non-integer multiple of the packet width. The system comprises an output mechanism having a width for providing data of packets from the memory mechanism.

The present invention pertains to a method for switching packets from input mechanisms to output mechanisms, each having a width. The method comprises the steps of receiving a first packet and at least a second packet at a switch mechanism. The method comprises the steps of transferring data of the first packet and the second packet to a memory mechanism via time division multiplexing of a bus having a width so data from the packets fills a predetermined portion of the width of the bus. The bus width is not equal to the input and output mechanism widths.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
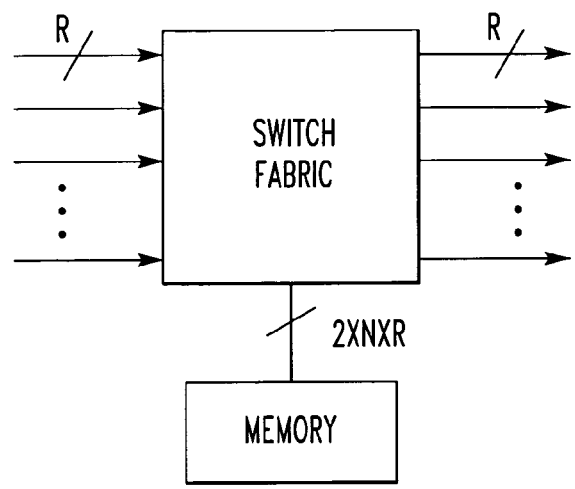
FIG. 1 is a schematic representation of a prior art time division multiplexed switch.
Figure 2:
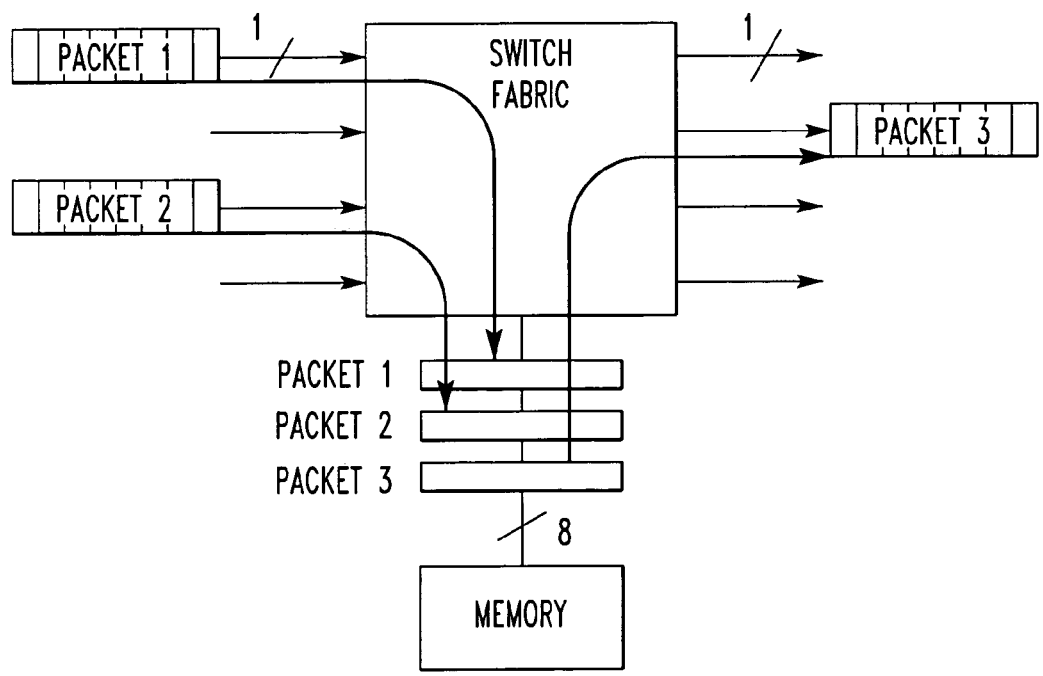
FIG. 2 is a schematic representation of a prior art time division multiplexed switch with 4 inputs and 4 outputs.
Figure 3:
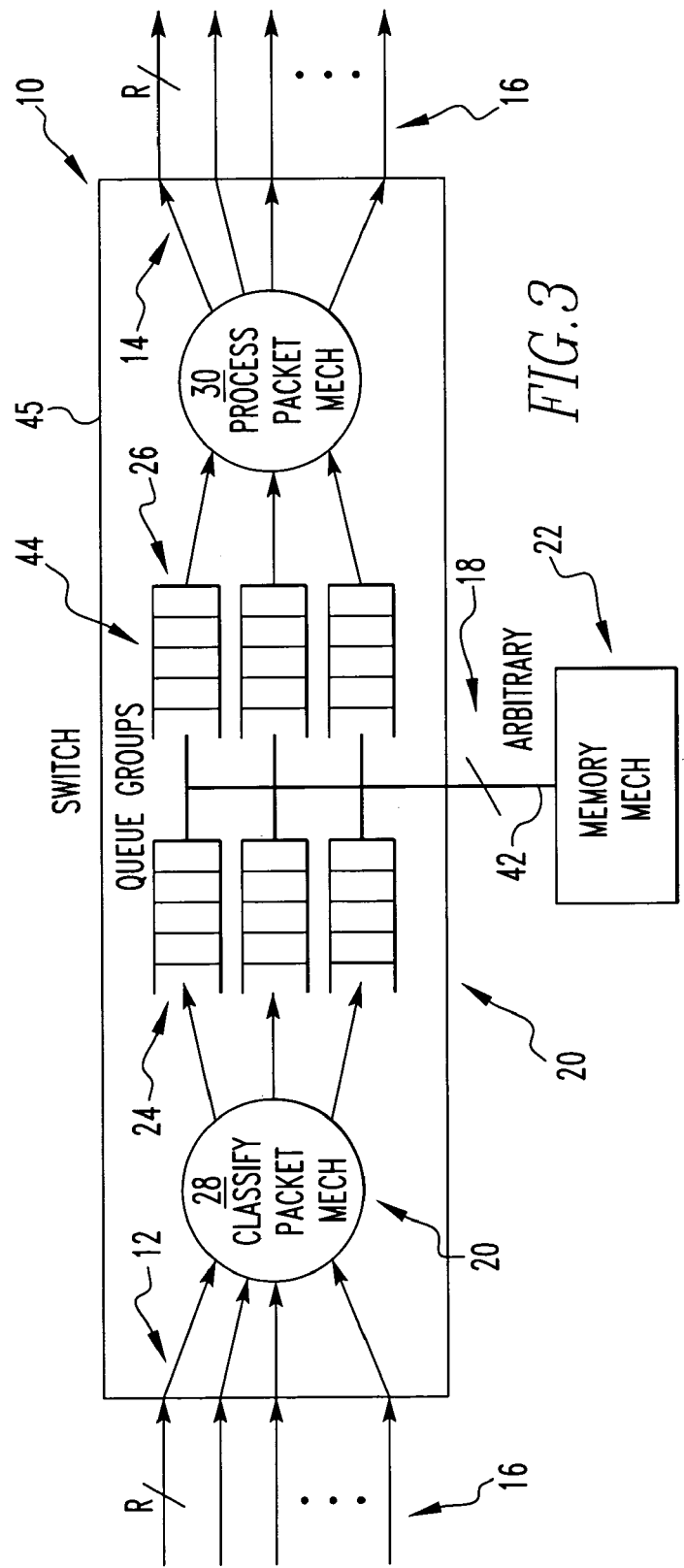
FIG. 3 is a schematic representation of a switching system of the present invention.
Figure 4:
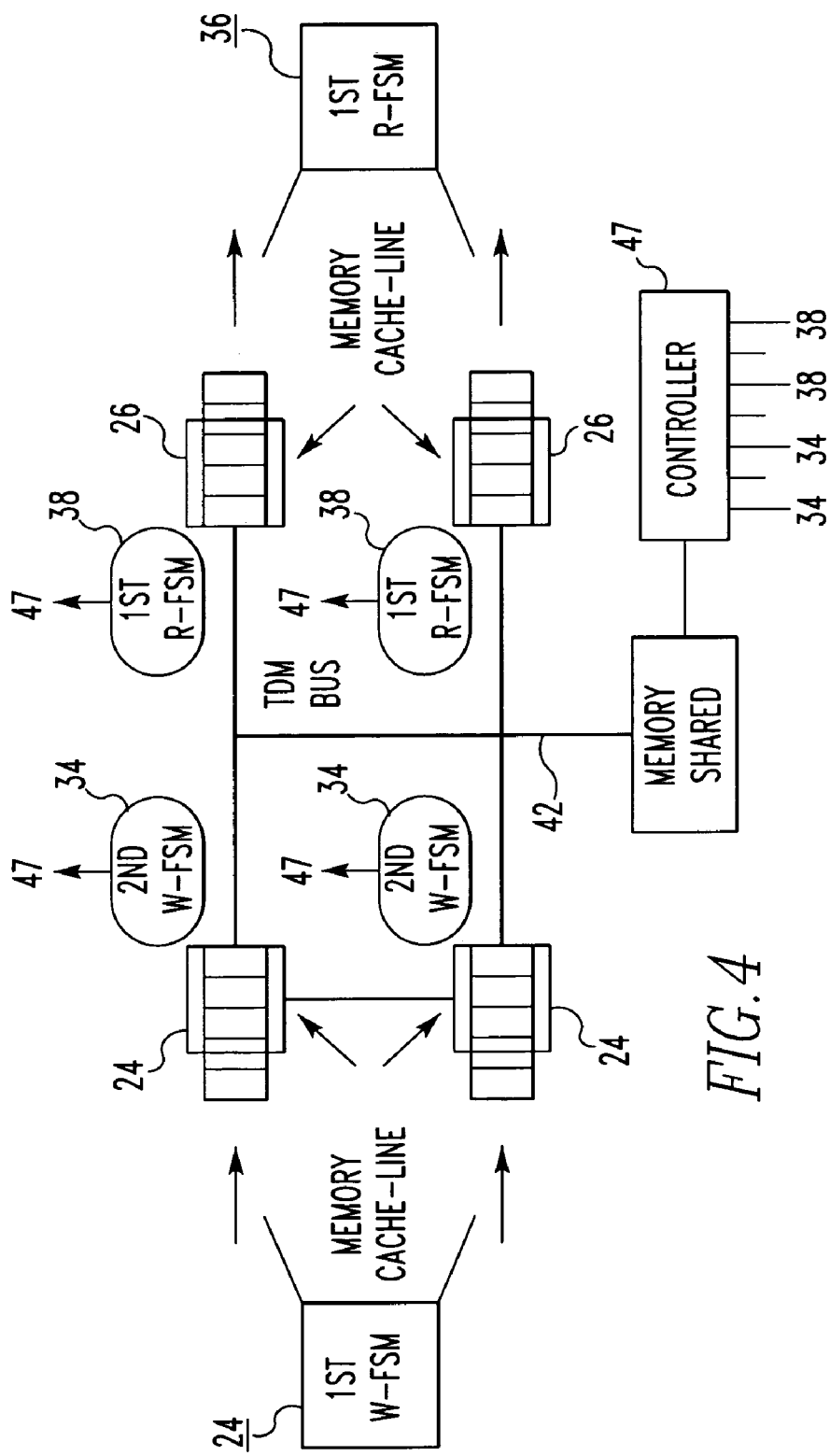
FIG. 4 is a schematic representation of a switching system of the present invention.

Referring now to the drawings wherein like reference numerals refer to similar or identical parts throughout the several views, and more specifically to FIGS. 3 and 4 thereof, there is shown a switching system 10. The system 10 comprises I input port mechanisms 12 having a width which receive packets from a communication line 16, where I is greater than or equal to 1 and is an integer. Preferably, an input port mechanism 12 includes an input port. The system 10 comprises O output port mechanisms 14 having a width which send packets to a communication line 16, where O is greater than or equal to 1 and is an integer. Preferably, an output port mechanism 14 includes an output port. The system 10 comprises a carrier mechanism 20 along which packets travel. The carrier mechanism 20 has a width wider than the width of the input and output mechanisms. The carrier mechanism 20 is connected to each input port mechanism and each output port mechanism. The system 10 comprises a memory mechanism 22 in which packets are stored. The memory mechanism 22 is connected to the carrier mechanism 20. The system 10 comprises a mechanism for providing packets to the memory mechanism 22 though the carrier mechanism 20 from the input port mechanisms 12. The providing mechanism 20 is able to transfer packets or portions of packets whose total size equals the width of the carrier mechanism 20 in each transfer cycle to the memory mechanism 22.

Preferably, the width of the carrier mechanism 20 is independent of the width of any of the input and output mechanisms. The input port mechanism preferably receives variable sized packets. Preferably, the output port mechanism sends variable sized packets to the communication line 16. The communication line 16 can be an ATM network.

Preferably, the providing mechanism 20 also provides packets from the memory mechanism 22 to the output port mechanisms 14 through the carrier mechanism 20. The providing mechanism 20 is able to transfer packets or portions of packets whose total size equals the width of the carrier mechanism 20 in each transfer cycle from the memory mechanism 22.

The providing mechanism 20 preferably includes an input stage of queue groups 24 connected to the carrier mechanism 20 and the input port mechanisms 12 for storing packets received by the input port mechanisms 12, and an output stage of queue groups 26 connected to the providing mechanism 20 and the output port mechanisms 14 for storing packets to be sent out the output port mechanisms 14, with each queue group corresponding to a packet. Preferably, the providing mechanism 20 includes a classifying mechanism 28 which places a packet which is received by the input port mechanism into a corresponding input stage queue group, said classifying mechanism 28 connected to the input port mechanisms 12 and the input queue groups 24. The providing mechanism 20 preferably includes a processing mechanism 30 which places a packet in an output stage queue group into a corresponding output port mechanism, said processing mechanism 30 connected to the output port mechanisms 14 and the output stage queue groups 26.

Preferably, the classifying mechanism 28 includes a first write finite state machine 32 for writing packets into a corresponding input queue, the providing mechanism 20 includes a second write finite state machine 34 for writing packets from an input stage queue group into the memory mechanism 22, and a first read finite state machine 36 for reading packets from the memory mechanism 22 to an output stage queue group, and the processing mechanism 30 includes a second read finite state machine 38 for reading a packet from the output stage queue group to the network.

The memory mechanism 22 preferably includes a shared memory 40. Preferably, packets or portions of packets travel on the carrier mechanism 20 based on time division multiplexing. The carrier mechanism 20 preferably includes a bus 42. Preferably, the first read finite state machine 36 only transfers data of packets of an input stage queue group to the bus 42 when the input stage queue group contains at least one cache-line of data.

The present invention pertains to a switching system 10 for packets. The system 10 comprises a central resource 44 having a width and an overall bandwidth and input port mechanisms 12 and output port mechanisms 14 for receiving or sending packets, respectively. The central resource 44 is partitioned via time slots that are allocated to the input and output port mechanisms 14. The central resource 44 width is independent of any input port or output port mechanisms width and the overall bandwidth can grow without bound. The system 10 comprises a memory mechanism 22 for storing packets. The memory mechanism 22 is connected to the central resource 44.

Preferably, the central resource 44 includes a memory bus 42. The central resource 44 preferably includes queue groups in which packets are classified, and the packets are read from and written into the memory mechanism 22 from the queue groups.

The present invention pertains to a switching system 10. The system 10 comprises a time division multiplex bus 42. The system 10 comprises a memory mechanism 22 connected to the bus 42 which is accessed via time division multiplexing of the bus 42. The system 10 comprises a mechanism for reading and writing data of packets to the memory mechanism 22 through the bus 42 without knowledge of the packet boundaries of the data.

The present invention pertains to a switching system 10. The system 10 comprises a time division multiplex carrier mechanism 20 having a width. The system 10 comprises a memory mechanism 22 connected to the carrier mechanism 20. The system 10 comprises a mechanism for providing data of packets to the memory mechanism 22 from an input port mechanism having a width so the data of the packets fills the width of the bus 42 via time division multiplexing. The system 10 comprises a mechanism for providing data of packets from the memory mechanism 22 to an output port mechanism having a width. The bus 42 width is a positive non-integer multiple of the input and output port mechanism widths.

The present invention pertains to a method for switching packets. The method comprises the steps of receiving a first packet and at least a second packet at a switch mechanism having a width. The method comprises the steps of transferring data of the first packet and the second packet to a memory mechanism 22 via time division multiplexing of a bus 42 having a width so data from the packets fills a predetermined portion of the width of the bus 42. The bus 42 width is not equal to the input port mechanism width.

The bus 42 width preferably is a positive multiple of the input port mechanism width and can be a non-integer multiple. Preferably, the transferring step includes the steps of placing the first packet and at least the second packet in an input stage queue group; and transferring data in the input stage queue group during an allocated time slot on the bus 42 to the memory mechanism 22 so the data fills the predetermined portion of the width of the bus 42.

Before the transferring data step, there is preferably the step of determining that the input queue group has at least enough data to fill the predetermined portion of the width of the bus 42 before data is transferred to the bus 42. Preferably, before the transferring data step, there is the step of determining that the input stage queue group has at least one-cache line of data.

In the operation of the invention, the system 10, the memory width limitation of typical TDM switching systems is removed by classifying packets into input stage queue groups 24 and then reading and writing data from the input stage queue groups 24 to memory. The memory width is independent of the minimum packet size and the overall bandwidth of the TDM switching system 10 can grow without bounds.

The packets that arrive on the input ports of the switching system 10 are classified into a fixed number of queue groups 24. A queue is implemented for each group in three stages:

1. The input stage: The tail of the queue is implemented in the switch fabric by a Write Finite State Machine (W-FSM).
2. The memory stage: The middle of the queue is implemented in the shared memory.
3. The output stage: The head of the queue is implemented in the switch fabric by a Read Finite State Machine (R-FSM).

Reads and writes to shared memory are implemented on data in the queue group and are performed without knowledge of the packet boundaries of the data in the queue. Access to the shared memory is allocated to the Read and Write FSMs via time division multiplexing of the shared memory bus 42. The width of the shared memory bus 42 is called a cache-line.

The W-FSM is implemented as follows:
  W-FSM Queue Fill Process:
    Packets arrive from the input ports, are categorized, and are added to the tail of an input stage W-FSM group queue.
  W-FSM Queue Drain Process:
    At (allocated time slot for TDM bus)
      If (W-FSM contains at least one cache-line of data)
        Write cache-line at head of W-FSM queue to tail of shared memory group queue The R-FSM is implemented as follows:
  R-FSM Queue Fill Process
    At (allocated time slot for TDM bus)
      If (R-FSM contains no data)
        If (shared memory contains data for this group queue)
          Read cache-line at head of shared memory queue to tail of R-FSM queue
        else (shared memory does NOT contains data for this group queue)
          Read any data from head of W-FSM queue (up to a cache-line) to tail of R-FSM queue R-FSM Queue Drain Process
    Packets are removed from the head of the output stage R-FSM queue, are processed, and transmitted to an output port.

More specifically, a cell or a packet arrives at an input port of the switch 45. A first write finite state machine 32 classifies the packet into a queue group 24. As other packets arrive at input ports of the switch 45, they are also classified by the first write finite state machine 32 into their corresponding queue group 24. Once classified into a queue group, they are appended to the end of the corresponding input stage queue group. This classifying and filling of cells received at input ports of the switch 45 continues over time. In regard to a specific input queue group 24, as a packet is categorized and classified to it, the packet is added to the tail of the corresponding input queue group 24.

A second write finite state machine 34 corresponding with the input stage queue group 24 keeps track of the number of packets in the input stage queue group 24. When there are enough packets in the input stage queue group 24 for the data in the input stage queue group 24 to fill the cache line of the memory 40 bus, the second write finite state machine 34 waits for the input queue group's 24 allocated time slot on the bus to arrive. Where the second write finite state machine 34 before did not release any data from the input stage queue group 24 to the bus when the allocated slot arrived because there was not enough data in the input stage queue group 24 to fill a cache line, now that there is enough data to fill the cache-line, the second write finite state machine 34 sends enough data from the input stage queue group 24 to fill a cache-line on the bus during the allocated slot of the input queue group 24. The allocated slot is of long enough duration to allow a cache-line of data to be sent onto the bus from the input stage queue group 24. As the cache line of data from the input stage queue group 24 is sent on the bus, the data that remains in the input stage queue group 24 is moved up to the head of the input stage queue group 24. Furthermore, the data that is moved up to the head of the input stage queue group 24 makes room for additional packets and thus data to be placed into the input stage queue group 24. There can be times when data is being sent onto the bus from the input stage queue group 24 and at the same time cells are being placed onto the tail of the input stage queue group 24.

Depending on the size of the cache-line, the data that is sent over the bus can be other than an integer multiple of packets in the input queue group 24 have. For exemplary purposes, the cache-line is of a width that a portion of a packet remains in the input stage queue group 24 after the cache-line of data has been sent onto the bus to the memory 40. The second write finite state machine 34 is ignorant of cell or packet boundaries and is only concerned with filling the cache-line with data whatever the result to the integrity of the cell or packet is. Thus, a cell or packet is broken up to accommodate the constraint that the data fills the cache-line during the allocated slot.

When the cache-line of data arrives at the shared memory 40 from the bus, a controller 47 stores the cache-line of data in the shared memory 40 and records the address in the shared memory 40 where the cache-line is stored as well as the order of that cache-line from the input stage queue group 24 and the input stage queue group 24 from which the cache-line arrives. Over time, cache-lines of data from different input stage queue groups 24 will be stored in the shared memory 40 by the controller 47, as well as the next cache-line sent by the input stage queue group 24 to the shared memory 40. The controller 47 keeps track of the addresses where the cache-lines from an input stage queue group 24 are stored. Subsequent cache-lines from an input stage queue group 24 do not necessarily need to be stored in the same address or even in two addresses next to each other, even though, for instance, the first cache-line from the input stage queue group 24 might have the first part of a cell and the second cache-line from the input stage queue group 24 might have the second part of the cell. This is not necessary as long as the controller 47 knows where the cache-lines from the input stage queue group 24 are located and the order in which the cache-lines arrived at the shared memory 40.

When a packet is to be transmitted from an output port, a first read finite state machine 36 corresponding to an output stage queue group 26 waits for the output stage queue group's 26 allocated time slot on the bus to arrive. The first read finite state machine 36 keeps track of data in the shared memory 40 which are to be read into the output stage queue group 26. The first read finite state machine 36 is in communication with the controller 47 and the write finite state machines so it knows which data is to go to the output stage queue group 26 to which it corresponds. When the allocated time slot arrives for the output stage queue group 26, the cache line whose turn it is next to be read from the shared memory 40 is read by the first read finite state machine 36 to the tail of the output stage queue group 26. When the next allocated time slot arrives for the output stage queue group 26, the cache-line in the shared memory 40 for the output stage queue group 26 is read into the output stage queue group 26 by the first read finite state machine 36. The first read finite state machine 36 knows from which address to read a cache-line by communicating with the controller 47. Since cache-lines are read in order, and placed on the tail of the output stage queue group 26, any cells that have been broken up during the writing stage into the shared memory 40 are reunited when the separate cache-lines are reunited in the output stage queue group 26. If there is no data in the shared memory 40 when the allocated time slot for the output stage queue group arrives, then the read finite state machine will read data up to the cache-line directly from an input stage queue group 24 whose data is to ultimately go into the output stage queue group 26.

A second read finite state machine 38 keeps track of the packets in the output stage queue groups. Only when a predetermined amount of packets, are formed in the output stage queue group 26 will the second read finite state machine 38 read packets up to a predetermined amount from the output stage queue group 26 and send them to an output port which sends them onto the network.

Since all reads and writes to memory contain a full cache-line of data, memory bus 42 efficiency is 100%. Small packets do not cause fragmentation of data on the memory bus 42. Furthermore, the memory bus width can grow without bounds and is not limited by packet size.

The queue group model can be used to implement arbitrary queuing structures. To implement output queues, one queue group is allocated for each output port. A queue group consists of the input stage queue group, some number of cache-lines stored in the shared memory, and the output stage queue group. The packet classifier examines each packet on input, and classifies the packet into the appropriate output queue. The packets are routed to the input stage queue group that corresponds to that output queue. The output queues 28 are queued to/from memory using the W-FSMs and R-FSMs. After the R-FSM, the packets are queued immediately to an output port.

Input queues are implemented using a trivial packet classifier, by associating one queue group 24 for each input port.

A priority-based scheme can be implemented as follows. A queue group is defined for each of several priority levels. On input, a packet is classified into one of the priority queue groups. The queue groups are queued to memory using the W-FSMs and R-FSMs. After the R-FSM, the packets are processed to determine their output ports and transmitted from the fabric.

EXAMPLE

Figure 5:
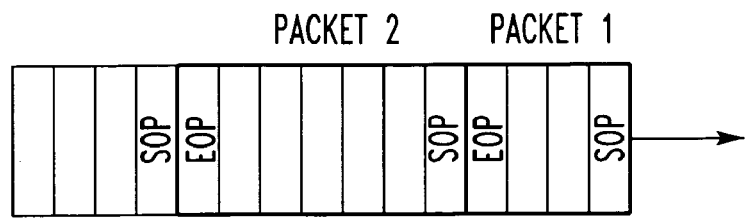
FIG. 5 is a schematic representation of a code word.

A four input port, four output port packet switch is implemented using the system 10. The system is globally synchronous and operates on a 20 MHz clock. The four inputs operate at 8-bits wide and implement four 160 Mbps interfaces. The packets are delineated using a start of packet (SOP) and end of packet (EOP) code word, as shown in FIG. 5.

The example assumes an output queued switch. The packets that arrive on the input ports of the switching system 10 are classified into four queue groups, one for each output port. Referring to FIG. 4, an output queue is implemented for each group in three sub-systems:
1. The tail is implemented in the switch fabric by a Write Finite State Machine (W-FSM).
2. The middle is implemented in the shared memory.
3. The head is implemented in the switch fabric by a Read Finite State Machine (R-FSM).

Reads and writes to shared memory are implemented on data in the queue group and are performed without knowledge of the packet boundaries of the data in the queue. Access to the shared memory is allocated to the Read and Write FSMs via time division multiplexing of the shared memory bus. The width of the shared memory bus is called a cache-line.

Figure 6:
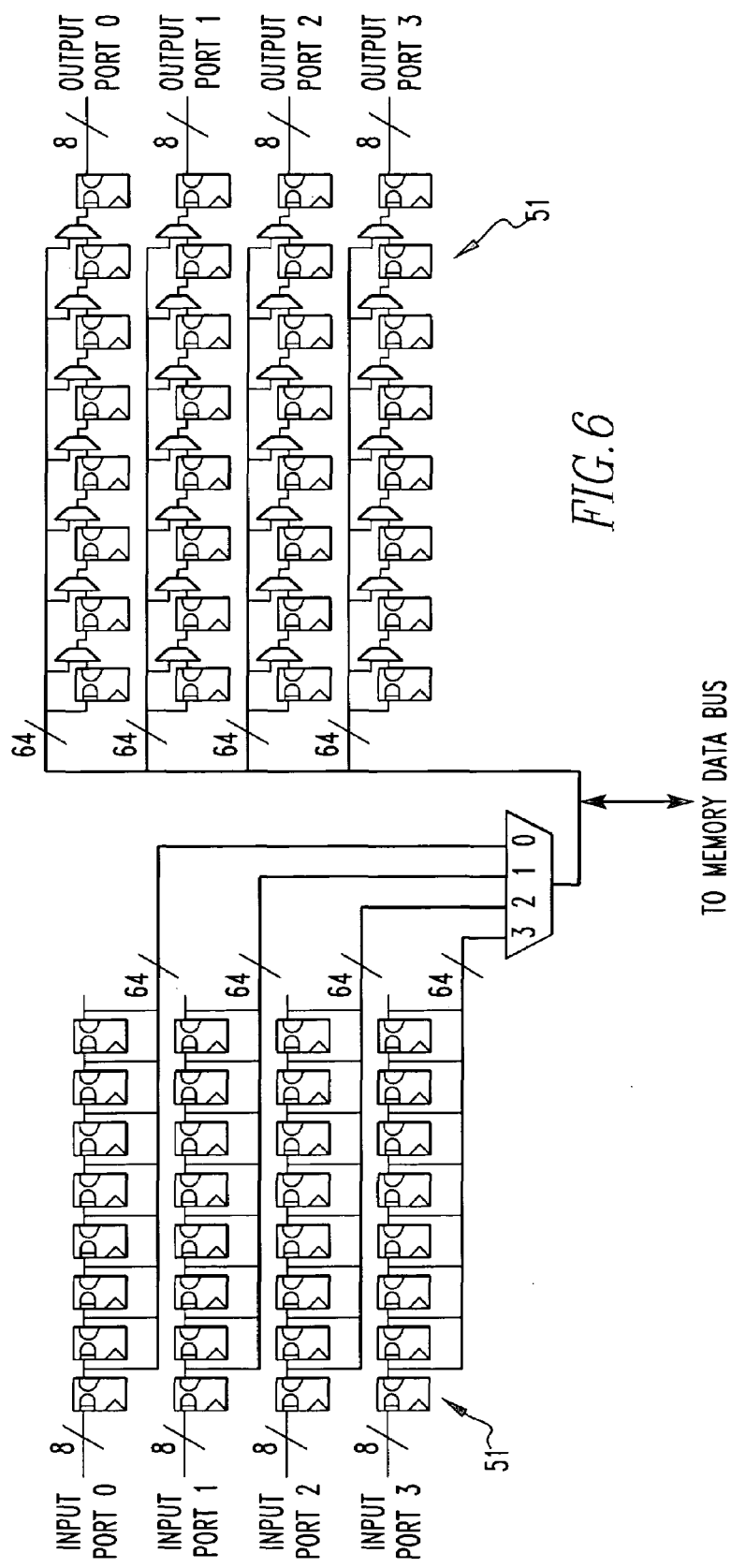
FIG. 6 is a schematic representation of a data path of a four port path.

The head and tail of the queue group located in the input stage and output stage of the invention are implemented directly in shift registers 51. The shift registers 51 are as wide as the incoming data interfaces and as long as the memory cacheline. The data path for the four port switch is shown in FIG. 6.

Figure 7:
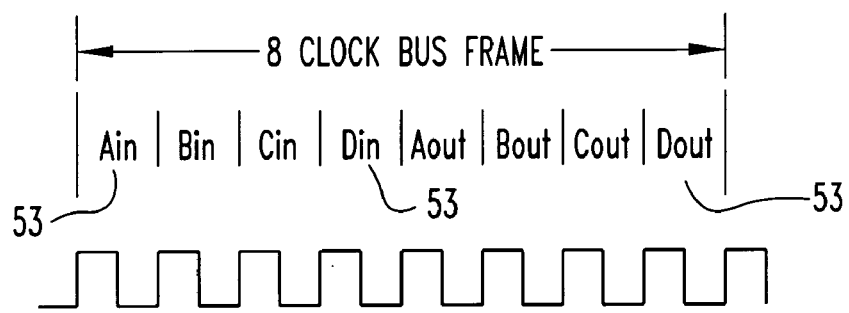
FIG. 7 is a schematic representation of a memory bus divided in a TDM fashion.

The cacheline is 64-bits long and contains eight bytes. Data from each port is shifted into an 8-register deep, 8-bit wide cacheline shift register. Not shown is a synchronization shift register prior to the shift register that is also an 8-deep 8-bit register. The memory bus is divided in a TDM (time division multiplex) fashion into eight time slots 53, one for each input and output port, as shown in FIG. 7. Since the example switch implements output queues, the output stage queues are always drained at the same rate, and therefore always use the same time slot on the bus. Since arriving packets can be destined for any output port, the input stage queues can be filled at any arbitrary rate. The input stage groups are allocated the input bus time slots as they are needed. Since the total input rate does not exceed four time slots, it is sufficient to let the input stages arbitrate for the four input stage time slots.

The synchronization register is used to guarantee that no data is lost. Data typically is not stored in the synchronization register. All arriving packets are written directly into the cacheline register. If the cacheline register fills prior to its time slot on the TDM bus, then the synchronization register begins storing data. Once the cacheline register is emptied, the data from the synchronization register is pushed into the cacheline register. If the cacheline register is still filled, it immediate arbitrates for the next input bus cycle. Only filled cacheline registers arbitrate for bus cycles.

Figure 8:
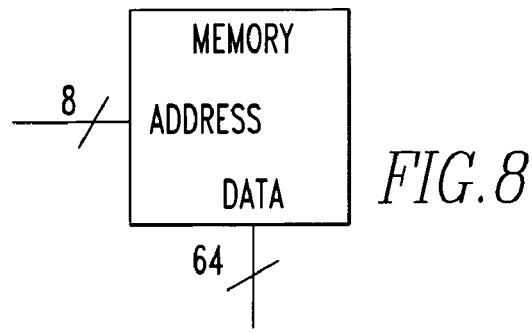
FIG. 8 is a schematic representation of a memory.

The head and tail of the queue groups (the input and output stages of the invention) are implemented directly with FIFO queues in hardware, as shown in FIG. 8. The middle of the queue groups are implemented in memory and are stored as cachelines. In this example, a 256 deep memory is used that can read and write an entire cacheline on a single clock cycle. Zero turn around memories (ZBT) are assumed, so that writes may follow reads directly.

Figure 9:
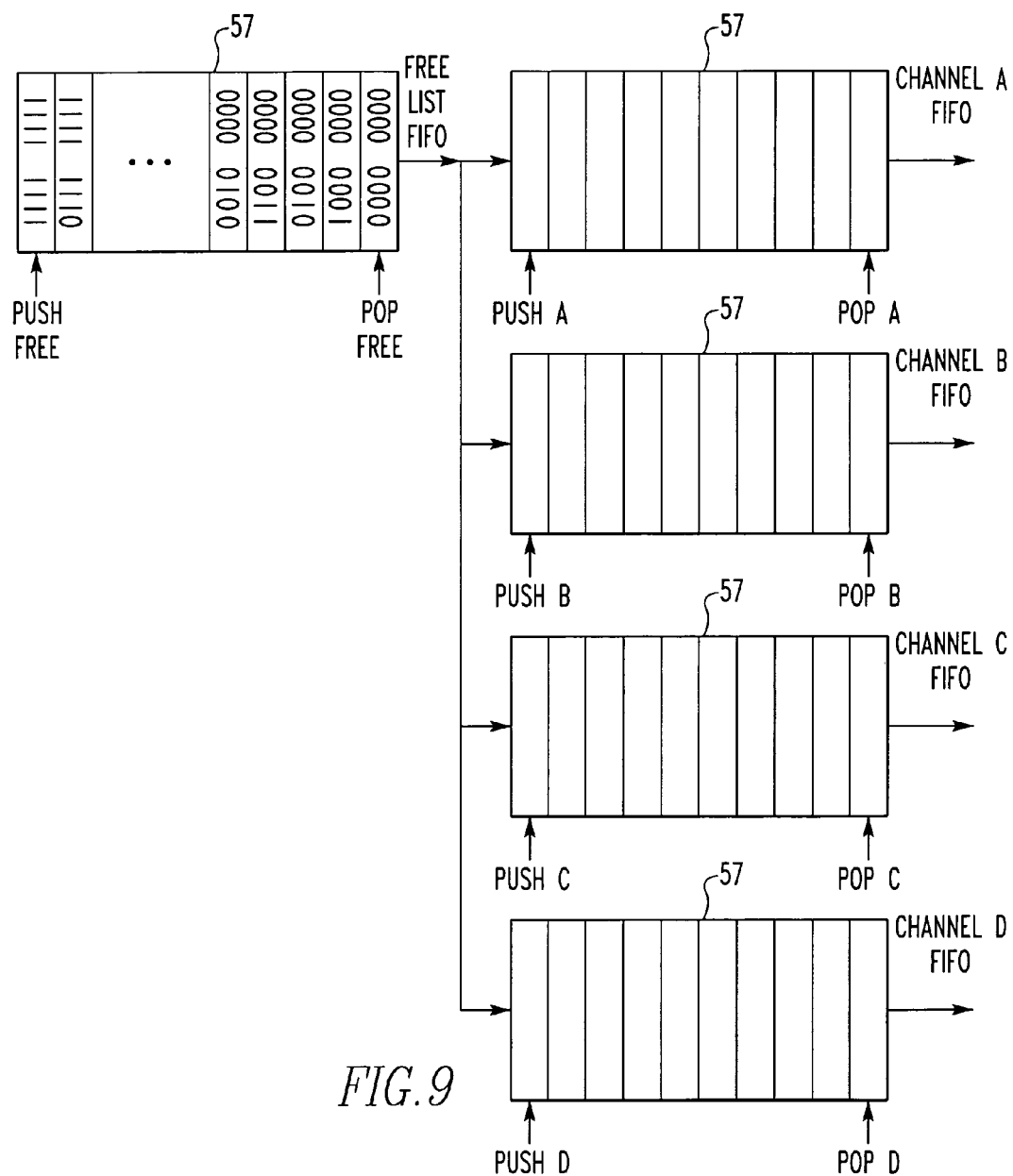
FIG. 9 is a schematic representation of five FIFO queues.

Five FIFO queues 57, as shown in FIG. 9, are required to implement the middle of the queue groups in memory. Four of the queues contain addresses of the cachelines that are contained in the memory, one for each of the queue groups. The fifth FIFO queue, the freelist, contains addresses of cachelines that are empty. At reset the freelist FIFO is initialized to contain all addresses of the cachelines that are contained in the memory and the channel address FIFOs are empty.

The datapath operates in one of eight states:
Ain, Bin, Cin, Din, Aout, Bout, Cout, Dout The states are determined by the timeslot indicated by the memory frame given above. In this example, the four output queue groups use their identified state. The input stages request to use any of the input states. An arbitrator is used to identify which input stage uses each appropriate input time slot. All input (output) states operate in the same manner. Consider input state Ain, an input state in which input stage A has successfully arbitrated for the input state. At the first clock cycle in the TDM frame Ain operates as follows:

At (allocated time slot for TDM bus)
  If (A cacheline register is full)
    Use address at head of FreeList to drive memory bus
    Write data contained in channel A cacheline register to memory
    Pop FreeList memory address
    Push FreeList memory address to tail of channel A address FIFO If the FreeList address FIFO is empty, then the data located in the channel A cacheline register is dropped. Care must be taken to identify the dropped packets in channel A. The other input channels operate in a similar fashion at their identified memory time slot.

Consider output state Aout. At the fifth clock cycle in the TDM frame Aout operates as follows:

At (allocated time slot for TDM bus)
  If (R-FSM contains no data)
    If (shared memory contains data for this group queue)
      Read cache-line at head of shared memory queue to tail of R-FSM queue
    else (shared memory does NOT contains data for this group queue)
      Read any data from head of W-FSM queue (up to a cache-line) to tail of R-FSM queue In regard to the R-FSM queue drain process, packets are removed from the head of the R-FSM queue, are processed, and transmitted to an output port.

Since all reads and writes to memory contain a full cache-line of data, memory bus efficiency is 100%. Small packets do not cause fragmentation of data on the memory bus. Furthermore, the memory bus width can grow without bounds and is not limited by packet size.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A switching system comprising:
   I input port mechanisms with a width, which receive packets having data from a communication line, where I is greater than or equal to 1 and is an integer;
   O output port mechanisms with a width, which send packets to a communication line, where O is greater than or equal to 1 and is an integer;
   a carrier mechanism for carrying packets in an allocated time slot, said carrier mechanism having a width wider than the width of the input and output port mechanisms so data from more than one packet at a time is transferred in the allocated time slot, said carrier mechanism connected to each input port mechanism and each output port mechanism;
   a memory mechanism in which packets are stored, said memory mechanism connected to the carrier mechanism; and
   a mechanism for providing data from more than one packet at a time to the memory mechanism through the carrier mechanism from the input port mechanisms, the providing mechanism includes input stage queue groups connected to the carrier mechanism and the input port mechanisms for storing packets received by the input port mechanisms, and output stage queue groups connected to the providing mechanism and the output port mechanisms for storing packets to be sent out the output port mechanisms, said providing mechanism transferring more than one packet at a time in the allocated time slot whose total width equals the width of the carrier mechanism in each allocated time slot to the memory mechanism, said providing mechanism transferring more than one packet at a time to the memory mechanism in the allocated time slot only when there is enough data from more than one packet from an input stage queue group to fill the width of the carrier mechanism but not transferring any data from any packets from the input stage queue group in the allocated time slot when there is not enough data to fill the width of the carrier mechanism.

2. A switching system as described in claim 1 wherein the width of the carrier mechanism is independent of the width of any packet.

3. A system as described in claim 2 wherein the input port mechanism receives variable sized packets.

4. A switching system as described in claim 3 wherein the output port mechanism sends variable sized packets to the communication line.

5. A system as described in claim 4 wherein the providing mechanism also provides packets from the memory mechanism to the output port mechanisms through the carrier mechanism, said providing mechanism transferring packets or portions of packets whose total data equals the width of the carrier mechanism in each transfer cycle from the memory mechanism.

6. A system as described in claim 5 wherein the providing mechanism includes a classifying mechanism which places a packet which is received by the input port mechanism into a corresponding queue group, said classifying mechanism connected to the input port mechanisms and the input stage queue groups.

7. A system as described in claim 6 wherein the providing mechanism includes a processing mechanism which places a packet in an output queue group into a corresponding output port mechanism, said processing mechanism connected to the output port mechanisms and the output queue groups.

8. A system as described in claim 7 wherein the clarifying mechanism includes a first write finite state machine for writing packets into a corresponding input queue, the providing mechanism includes a second write finite state machine for writing packets from an input queue group into the memory mechanism, and a first read finite state machine for reading packets from the memory mechanism to an output queue group, and the processing mechanism includes a second read finite state machine for reading a packet from the output queue group to the network.

9. A system as described in claim 8 wherein the memory mechanism includes a shared memory.

10. A system as described in claim 9 wherein packets or portions of packets travel on the carrier mechanism based on time division multiplexing.

11. The system as described in claim 10 wherein the carrier mechanism includes a bus.

12. A system as described in claim 11 wherein the first read finite state machine only transfers data of packets of an input queue group to the bus when the input queue group contains at least one cache-line of data.

13. A system as described in claim 12 wherein the communication line is an ATM network.

14. A system as described in claim 13 wherein the memory mechanism has packets stored in it without knowledge of the packet boundaries of the packets.

15. A switching system for packets comprising:
a central resource having a width and an overall bandwidth and input port mechanisms and output port mechanisms each having widths for receiving or sending packets, respectively, said central resource partitioned via time slots that are allocated to the input and output port mechanisms, said central resource width independent of any input or output port mechanisms width and the overall bandwidth can grow without limitation by the input or output port mechanisms width; and
a memory mechanism for storing packets, said memory mechanism connected to the central resource and receiving more than one packet at a time in a respective time slot from the central resource which completely fills the width of the central resource, the central resource transferring more than one packet at a time to the memory mechanism in the respective time slot only when there is enough data from more than one packet to fill the total width but not transferring any data from any packets in the respective time slot when there is not enough data to fill the total width of the carrier mechanism.

16. A switching system as described in claim 15 wherein the central resource includes a memory bus.

17. A switching system as described in claim 16 wherein the central resource includes queue groups in which packets are classified, and the packets are read from and written into the memory mechanism from the queue groups.

18. A switching system comprising:
a time division multiplex bus having a width;
a memory mechanism connected to the bus which is accessed via time slots in time division multiplexing of the bus; and
a mechanism for reading and writing data of packets to the memory mechanism through the bus without knowledge of the packet boundaries of the data, the reading and writing mechanism transferring more than one packet at a time to or from the memory mechanism in a respective time slot only when there is enough data from more than one packet to fill the width but not transferring any data from any packets in the respective time slot when there is not enough data to fill the width of the bus.

19. A switching system comprising:
a time division multiplex carrier mechanism having a width;
a memory mechanism connected to the carrier mechanism which is accessed via time slots in time division multiplexing of the bus; and
an input stage mechanism having a width for providing data of packets to the memory mechanism so the data of the packets fills the width of the bus via time division multiplexing, said bus width being a positive non-integer multiple of the input stage mechanism width a mechanism for providing data of packets having a width to the memory mechanism so the data of the packets fills the width of the bus via time division multiplexing, said bus width a positive non-integer multiple of the packet width greater than one, the input stage mechanism transferring more than one packet at a time to the memory mechanism in a respective time slot only when there is enough data from more than one packet to fill the width but not transferring any data from any packets in the respective time slot when there is not enough data to fill the width of the carrier mechanism.

20. A method for switching packets having a width comprising the steps of:
receiving a first packet and at least a second packet at a switch mechanism; and
transferring data of the first packet and the second packet to a memory mechanism via time slots in time division multiplexing of a bus having a width only when data from the packets fills a predetermined portion of the width of the bus in a time slot, but not transferring any data from the first and second packets in the time slot when there is not enough data to fill the predetermined portion of the width of the bus, said bus width not a function of the data contained in any packet.

21. A method as described in claim 20 wherein the bus width is a positive non-integer multiple of the packet width.

22. A method as described in claim 21 wherein the transferring step includes the steps of placing the first packet and at least the second packet in an input queue group; and transferring data in the input queue group during an allocated time slot on the bus to the memory mechanism so the data fills the predetermined portion of the width of the bus.

23. A method as described in claim 22 wherein before the transferring data step there is the step of determining that the input queue group has at least enough data to fill the predetermined portion of the width of the bus before data is transferred to the bus.

24. A method as described in claim 23 wherein before the transferring data step there is the step of determining that the input queue group has at least one-cache line of data.

* * * * *

UNITED STATES PATENT AND TRADEMARK OFFICE
CERTIFICATE OF CORRECTION

PATENT NO. : 7,031,330 B1
APPLICATION NO. : 09/293563
DATED : April 18, 2006
INVENTOR(S) : Bianchini, Jr.

It is certified that error appears in the above-identified patent and that said Letters Patent is hereby corrected as shown below:

In Column 11, Lines 16 & 18, in Claim 7, insert -- stage --, before "queue" at each occurrence throughout the claim.

In Column 11, Line 20, in Claim 8, delete "clarifying" and insert -- classifying --, therefor.

In Column 11, Lines 20-29, in Claim 8, insert -- stage --, before "queue" at each occurrence throughout the claim.

In Column 11, Lines 40, in Claim 12, insert -- stage --, before "queue".

In Column 12, Line 67, in Claim 21, delete "width." and insert -- size. --, therefor.

In Column 13, Lines 3-4, in Claim 22, insert -- stage --, before "queue" at each occurrence throughout the claim.

In Column 14, Line 1, in Claim 23, insert -- stage --, before "queue".

In Column 14, Line 5, in Claim 24, after "data" delete "step" and insert -- step, --, therefor.

In Column 14, Line 6, in Claim 24, insert -- stage --, before "queue".

Signed and Sealed this

Sixth Day of January, 2009

JON W. DUDAS
*Director of the United States Patent and Trademark Office*